United States Patent [19]

Uzelmeier et al.

[11] 3,968,181

[45] July 6, 1976

[54] MODIFIED ACRYLATE RESIN

[75] Inventors: Christopher W. Uzelmeier, Laurel Springs; Paul D. Jones, Cherry Hill, both of N.J.

[73] Assignee: Shell Oil Company, Houston, Tex.

[22] Filed: Mar. 17, 1975

[21] Appl. No.: 559,183

[52] U.S. Cl. .................. 260/837 R; 204/159.15; 260/836; 428/418
[51] Int. Cl.² ........................................ C08G 45/06
[58] Field of Search .................. 260/836, 837 R; 204/159.16, 159.15

[56] References Cited
UNITED STATES PATENTS 3,506,736  4/1970  Najvar et al. ..................... 260/835
3,882,187  5/1975  Takiyama et al. .................. 260/835

Primary Examiner—Murray Tillman
Assistant Examiner—T. Pertilla

[57] ABSTRACT

A modified photocurable acrylate resin with improved adhesion to metals is prepared by reacting a liquid polyepoxide, an ethylenically unsaturated conjugated organic carboxylic acid, and the half ester of an aliphatic monohydric alcohol and a polycarboxylic acid anhydride.

3 Claims, No Drawings

MODIFIED ACRYLATE RESIN

BACKGROUND OF THE INVENTION

This invention relates to an improved resin composition. More particularly, this invention relates to a modified photocurable acrylate resin with improved adhesion to metals. Specifically, the invention discloses a photocurable resin prepared by contacting a polyepoxide, an ethylenically unsaturated conjugated organic carboxylic acid, and the half ester of a polycarboxylic acid anhydride.

THE PRIOR ART

Cured polyepoxides have many desirable properties such as solvent and chemical resistance, and there has been an increasing desire to transfer many of these desirable properties over to the conventional polyester type products. This transfer is typically accomplished by reacting the polyepoxides with an unsaturated monocarboxylic acid, such as, for example, acrylic acid. The products prepared in this manner can be cured to form products having the desired characteristics of the polyepoxides as well as those of the unsaturated polyesters. A valuable product of this type, for example, can be obtained by reacting a glycidyl polyether of 2,2-bis(4-hydroxyphenyl)-propane with acrylic acid. Such product can be represented by the following formula:

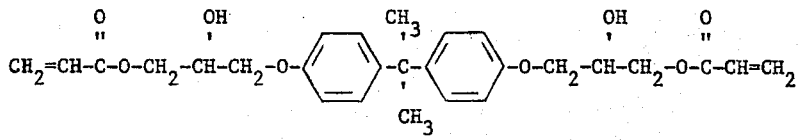

The hydroxy-substituted unsaturated polyesters of the above type, however, have certain undesirable properties which have limited their use in industrial coatings. For example, light-cured films obtained from these polyesters do not have acceptable adhesion to metal surface characteristics.

One approach to improve the adhesion characteristics of polyesters is taught in British Pat. No. 1,360,910. In the British patent an epoxy compound is reacted with an unsaturated monocarboxylic acid and a saturated or unsaturated alkyd resin with 1–4 terminal carboxyl groups to form an unsaturated epoxy-ester resin which is cured by electron beam irradiation. However, the method taught in the British patent often produces resins that are too viscous for some applications. It has now been found that the adhesion characteristics of certain UV-curable acrylate resin compositions are also improved by replacing a specified percentage of the acrylate-type acid reactant with a half ester of an aliphatic monohydric alcohol and a polycarboxylic acid anhydride.

SUMMARY OF THE INVENTION

The present invention discloses a curable composition and the method for making the same, wherein the curable resin is prepared by contacting a liquid polyepoxide with a half ester of an aliphatic monohydric alcohol and a polycarboxylic acid anhydride and with an ethylenically unsaturated conjugated organic carboxylic acid.

DETAILED DESCRIPTION OF THE INVENTION

The curable resin composition is prepared by contacting a half ester of an aliphatic monohydric alcohol and a polycarboxylic acid anhydride, an ethylenically unsaturated conjugated organic carboxylic acid and a polyepoxide in a ratio of between about 0.3 and about 0.9 chemical equivalents of the half ester per chemical equivalent of the polyepoxide and between about 0.7 and about 0.1 chemical equivalents of the carboxylic acid per chemical equivalent of the polyepoxide. The theorized structure obtained by contacting one mole of the diglycidyl ether of 2,2-bis(4-hydroxyphenyl)propane (2 chemical equivalents) which one mole of the methyl half ester of maleic anhydride (1 chemical equivalent) and one mole of acrylic acid (1 chemical equivalent) is as follows:

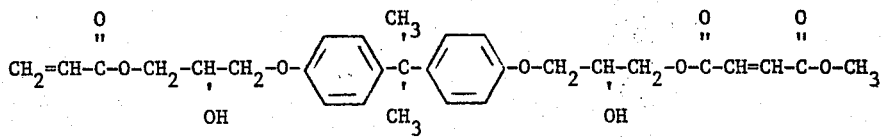

THE POLYEPOXIDES

The liquid polyepoxides employed in the present invention include those compounds possessing one or more vic-epoxy groups, i.e. one or more

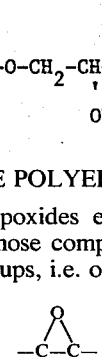

groups. These polyepoxides are saturated or unsaturated, aliphatic, cycloaliphatic, aromatic or heterocyclic, and are substituted, if desired, with non-interfering substituents, such as halogen atoms, hydroxyl groups, ether radicals, and the like. Polyepoxides employed are monomeric or polymeric. Preferred liquid polyepoxides include the so-called liquid glycidyl polyethers of polyhydric phenols and polyhydric alcohols. Especially preferred are the glycidyl polyethers of 2,2-bis(4-hydroxyphenol)propane having an average molecular weight between about 300 and about 900 and an epoxide equivalent weight of between about 140 and about 500.

Various examples of polyepoxides that may be used in this invention are given in U.S. 3,408,422 and it is to be understood that so much of the disclosure of that patent relative to examples of polyepoxides is incorporated by reference into this specification.

THE ETHYLENICALLY UNSATURATED CONJUGATED ORGANIC CARBOXYLIC ACIDS

The ethylenically unsaturated conjugated organic carboxylic acids employed include aliphatic, cycloaliphatic, and aromatic acids and also include monocarboxylic and poly-carboxylic acids. The term "conjugated" refers to the relative location of the unsaturation linkage and the carboxyl group. Examples of the acids to be utilized include acrylic acid, methacrylic acid, cyclohexene carboxylic acid, maleic acid, crotonic acid, alphaphenylacrylic acid, tetrahydrophthalic acid, 2,4-octadiene-carboxylic acid, dodecadienoic acid and the like. Preferred are the unsaturated aliphatic conjugated monocarboxylic acids of from 3 to about 10 carbon atoms. More preferred acids are acrylic acid and methacrylic acid. Especially preferred is acrylic acid.

THE HALF ESTER OF AN ALIPHATIC MONOHYDRIC ALCOHOL AND A POLYCARBOXYLIC ACID ANHYDRIDE

The half esters of an aliphatic monohydric alcohol and a polycarboxylic acid anhydride are prepared by conventional esterification methods wherein the alcohol and anhydride are heated, in the presence or absence of esterification catalysts, for a time sufficient to complete the esterification. Preferably, 1 mole of anhydride is reacted with 1 mole of alcohol. The esterification is generally carried out at temperatures of from about 75°F to about 400°F, preferably from about 100°F to about 250°F. An inert atmosphere is sometimes employed but is not generally required. The esterification reaction is performed at subatmospheric, atmospheric or superatmospheric pressures. Typically, catalysts are not required. However, if a catalyst is desired, suitable catalysts include mineral acids such as hydrochloric acid, sulfuric acid and phosphoric acid. Another suitable catalyst is sodium acetate. When a catalyst is employed, between about 0.1% and about 10.0% by weight based on the combined weight of the anhydride and the alcohol is used.

The polycarboxylic acid anhydrides used in the invention include, among others, maleic acid anhydride, chloromaleic acid anhydride, dichloromaleic acid anhydride, 1,2-cyclohexenedicarboxylic acid anhydride, vinylcyclohexane-dicarboxylic acid anhydride, phthalic anhydride, nadic anhydride and the like, and mixtures thereof. The preferred anhydrides to be used are the ethylenically unsaturated polycarboxylic acid anhydrides containing from 4 to 18 carbon atoms.

The aliphatic monohydric alcohols employed to prepare the half ester of the polycarboxylic acid anhydride include cyclic and acyclic aliphatic monohydric alcohols having up to about 20 carbon atoms, preferably from about 1 to about 6 carbon atoms. Preferred alcohols include methanol, ethanol, isopropanol, n-butyl alcohol, sec-butyl alcohol, n-amyl alcohol, isoamyl alcohol, t-amyl alcohol, and mixtures thereof. Suitable alcohols also include n-hexyl alcohol, cyclohexanol, iso-octyl alcohol, stearyl alcohol, and mixtures thereof.

PREPARATION OF THE PHOTOCURABLE COMPOSITION

The curable acrylate resin composition is prepared by contacting a half ester of an aliphatic monohydric alcohol and a polycarboxylic acid anhydride, an ethylenically unsaturated conjugated organic carboxylic acid and a polyepoxide in a ratio of between about 0.3 and about 0.9 chemical equivalents of the half ester per chemical equivalent of the polyepoxide and between about 0.7 and about 0.1 chemical equivalents of the carboxylic acid per chemical equivalent of the polyepoxide, preferably in the presence of a catalyst. A preferred composition is prepared by contacting the reactants in a ratio of between about 0.3 and about 0.5 chemical equivalents of the half ester per chemical equivalent of the polyepoxide and between about 0.7 and about 0.5 chemical equivalents of the carboxylic acid per chemical equivalent of the polyepoxide. A chemical equivalent amount of the polyepoxide refers to that amount needed to furnish one epoxy group per carboxyl group.

The preparation of the curable arcylate resin composition may be effected in any suitable manner. The preferred method comprises adding the polyepoxide, acid, half ester, catalyst, and solvent or diluent, if desired, in any order and then applying the necessary heat to initiate the reaction, after which the exothermic heat is removed. The reaction mixture may then be distilled or stripped to remove any of the necessary components, such as solvents, catalyst, excess reactants and the like.

Preferred catalysts to be utilized in the process include the onium salts, and preferably those containing phosphorus, sulfur or nitrogen, such as, for example, the phosphonium, sulfonium and ammonium salts of inorganic acids. Examples of these catalysts include, among others, tetramethylammonium chloride or bromide (TMAC or TMAB), triphenylphosphine, ethyltriphenylphosphonium iodide or bromide, dimethylbenzyl amine, and the like, and mixtures thereof. In general, the amount of the catalyst varies from about 0.05% to about 3.0% by weight, more preferably from about 0.3% to about 2.0% by weight of the reactants.

The preparation of the curable acrylate resin composition is conducted with or without the use of solvents or diluents. In many cases, the reactants are liquid and the reaction is easily effected without the addition of solvents or diluents. However, in some cases, where either or both reactants are solids or viscous liquids, it is desirable to add an acrylate reactive diluent to assist in effecting the reaction. Examples of reactive diluents are 2-ethyl hexyl acrylate, 2-hydroxy ethyl acrylate, 2-hydroxy propyl acrylate, trimethyl propane triacrylate, penterythritol triacrylate, neopentylglycol diacrylate, 1,6-hexanediol diacrylate and the like. If solvents are employed in the reaction and the resulting product is to be used for coating purposes, the solvent is generally retained in the reaction mixture and photocured into the final film.

The temperature employed in the reaction generally varies from about 125°F to about 300°F, preferably from about 200°F to about 260°F. The reaction is preferably conducted under atmospheric pressure, but higher and lower pressures are not precluded. The course of the reaction is conveniently followed by determination of the acidity. The reaction is considered to be substantially complete when the acidity has been reduced to less than about 0.01 eq./100 grams.

Other materials may also be added to the mixtures before they are cured. These include plasticizers, stabilizers, extenders, oils, resins, tars, asphalts and the like, as well as all types of coloring or pigments to give the material the desired color. It is often necessary to add a free radical inhibitor, such as hydroquinone, to the reactants prior to adding the catalyst. Oxygen must also be present during the reaction to inhibit premature gelation. For some applications, the curable acrylate resin mixture is used in admixture with unsaturated monomers, and preferably liquid monomers possessing at least one

group, such as styrene, alphamethylstyrene, chlorostyrene, dichlorostyrene, vinyl naphthalene, vinyl phenol and the like; unsaturated esters, such as acrylic and methyacrylic esters, vinyl acetate and the like; halides, such as vinyl chloride and vinylidene chloride; nitriles, such as acrylonitrile and methacrylonitrile; diolefins such as butadiene, isoprene and methylpentadiene, and mixtures thereof. Acrylate esters are preferred. These monomers are preferably used in amounts varying from about 0.5% to about 90% by weight of the mixture, and preferably from about 5% to about 55% by weight.

The resin composition is cured by any conventional curing technique including the standard peroxide technique and photochemical means. Photochemical curing includes both the use of gamma radiation and ultraviolet (UV) radiation. Where it is desired to employ an ultraviolet curing system it is necessary to add a photosensitizer such as, for example, a benzoin ether or combination of benzophenone and an alkyl dialkanolamine. Where the resin to be cured is prepared by contacting the diglycidyl ether of Bisphenol-A with acrylic acid and the methyl half ester of maleic anhydride, it is preferred that the composition be cured by an ultraviolet curing system.

The final modified resin compositions and their above-noted mixtures with other monomers are utilized in a wide variety of different applications. They are utilized in the preparation of coatings and impregnating compositions, in the preparation of adhesives for metals, wood, cement, and the like, and in the preparation of reinforced composite products, such as laminated products, filament windings, and the like. In these latter applications, the modified resin compositions, are applied to the fibrous products, such as glass fibers or sheets, and the material is then formed into the desired object. Because of their excellent adhesion to metal surfaces, the modified resin compositions of the present invention are particularly useful as metal coatings.

As shown in the following Illustrative Embodiment V, the photocured resin composition of the present invention has improved adhesion to metal surfaces as compared to the adhesion of a 100% acrylate resin composition. One reason for the improved adhesion is that the cross link density of the photocured resin composition prepared according to the present invention is less than the cross link density of a 100% acrylate resin composition. Significantly, when less than 25% of the acrylate is replaced by the half ester, the adhesion of the composition is not improved. However, if all of the acrylate portion of the resin is replaced with the half ester of the polycarboxylic acid anhydride, the time required for photocuring is substantially increased by at least about a factor of 10. Therefore, it is preferred to replace only between about 30 and about 50 percent of the acrylate groups with the half ester groups. When 50% of the acrylate groups are replaced by half ester, the cure rate is increased by a factor of approximately 2–5. Further, it is preferred that there not be an excess amount of acid present in the final resin composition since otherwise an odor will be present. On the other hand, it is important to react nearly all the epoxy groups in the resin to improve the functionality of the resin. In addition, it is also important to control the viscosity of the resin composition. Therefore, it is preferred to employ lower molecular weight alcohols and anhydrides to form the half ester of the polycarboxylic acid anhydride.

The invention is further illustrated by means of the following Illustrative Embodiments and a Comparative Example. Note that the embodiments and example are given for the purpose of illustration only and that the invention is not to be regarded as limited to any of the specific conditions or reactants recited therein.

ILLUSTRATIVE EMBODIMENT I

Preparation of the Methyl Half Ester of Maleic Anhydride

The methyl half ester of maleic anhydride is prepared by contacting 5 moles of maleic anhydride with 5 moles of methanol in a 1 liter flask. The flask is heated gently to about 140°F until the anhydride is dissolved in the alcohol, and then the homogenous liquid is allowed to exotherm to about 220°F. This methyl half ester of maleic anhydride is employed in all subsequent embodiments.

EPON 828 Resin is also employed in all embodiments and the comparative as the polyepoxide. EPON 828 Resin is the diglycidyl ether of Bisphenol A and has an average molecular weight of between about 360 and about 380 and an epoxide equivalent weight of between about 185 and about 192.

ILLUSTRATIVE EMBODIMENT II

Preparation of 25% Modified Acrylate Resin

In a 1 liter flask, 2 equivalents (378 grams) of EPON 828 Resin, 0.5 equivalents (65.5 grams) of the methyl half ester of maleic anhydride, 1.5 equivalents (108 grams) of glacial acrylic acid, and 200 ppm (0.11 grams) hydroquinone are heated to a temperature of about 220°F under an air sparge. After the temperature of the mixture has reached 220°F, 3.9 grams (0.7% wt of the reactants) of a 50% aqueous solution of trimethylammonium chloride (TMAC) is added to the mixture as a catalyst. In less than 1-¼ hours the acidity of the mixture is less than 0.02 eq./100 gram. A small amount of glacial acrylic acid or EPON 828 may be added as trim to balance the acid and the epoxy if desired. The final curable resin mixture has an acidity of 0.01 eq./100 g and an epoxide content of 0.0052 eq./100g.

ILLUSTRATIVE EMBODIMENT III

Preparation of 50% Modified Acrylate Resin

In Illustrative Embodiment III, 14 equivalents of EPON 828 Resin (2646 grams), 7 equivalents of the methyl half ester of maleic anhydride (924 grams), 7 equivalents of glacial acrylic acid (504 grams), and 200 ppm (0.81 grams) hydroquinone are mixed in a vessel and heated to a temperature of 205°F under an air sparge. Then 28.5 grams of 50% aqueous TMAC (0.7% wt) is added. The reaction is essentially completed after 2 hours. To the reaction mixture is added 76 grams of the polyepoxide to balance the acid. The final resin composition has an acidity of 0.0094 eq./100 grams, an epoxy content of 0.010 eq./100 grams, and a Gardner color of between 3 and 4.

ILLUSTRATIVE EMBODIMENT IV

Preparation of 100% Modified Resin

In this embodiment, the acrylic acid is completely replaced by the half ester. To a 1 liter flask is charged 2 equivalents of EPON 828 Resin (376 grams) and 2 equivalents of the methyl half ester of maleic anhydride (262 grams). The mixture is sparged with air and heated to a temperature of about 220°F, at which temperature 4.5 grams of 50% aqueous TMAC (0.7%) is added. After more than 3 hours, the reaction is essentially completed. To the reaction mixture is added 39.6 grams EPON 828 Resin to balance the acid and epoxide. The final resin composition has an acidity of 0.021 eq./100 grams and an epoxide content of 0.011 eq./100 grams.

COMPARATIVE EXAMPLE I

Preparation of Unmodified Acrylate Resin

One equivalent each of EPON 828 (188 grams) and glacial acrylic acid (72 grams) are heated to 200°F under an air sparge in the presence of 220 ppm hydroquinone (0.052 grams). Then 0.7% of 50% aqueous tetramethylammonium chloride catalyst is added (1.82 grams). The reaction is allowed to exotherm to 240°–250°F, where upon cooling is initiated to hold the temperature in that range. After 2 hours, 45 minutes, the acidity has fallen below 0.01 eq./100 g, the mixture is cooled to 170°F and removed.

ILLUSTRATIVE EMBODIMENT V

The resin compositions prepared in Illustrative Embodiments II, III and IV and in Comparative Example I are photocured by adding 30% 2-hydroxypropyl acrylate diluent and 5 phr Trigonal 14 photoinitiator to the resin, coating Q Steel panels with the resin mixture at 0.2–0.3 mil film thickness, and subjecting the coated panels to an ultraviolet lamp of 200 watts per linear inch at a line speed of 200 feet per minute. The degree of cure and adhesion to metal surfaces are measured by two standard tests employed by the paint and coating industry - MEK Rubs and Scotch Tape Adhesion, respectively. Some of UV cured panels are pasteurized for 45 minutes in water at 160°F prior to testing. Adhesion is retained after pasteurization. The results are shown below in Table I:

TABLE I

| Resin | UV Cured | | UV Cured - Pasteurized | |
|---|---|---|---|---|
| | MEK Rubs | Scotch Tape* Adhesion | MEK Rubs | Scotch Tape* Adhesion |
| 1) 100% Acrylate (C.E. I) | 54 | 0 | 100 | 0 |
| 2) 25% Maleate (I.E. II) | ~30 | 0 | ~50 | 0 |
| 3) 50% Maleate (I.E. III) | 7 | 10 | 10 | 10 |
| 4) 100% Maleate (I.E. IV) | Does Not Cure | | — | — |

*0 = Poor
10 = Excellent

We claim as our invention:

1. An ultraviolet curable acrylate resin composition with improved adhesion to metal surfaces comprising a mixture of (i) a half ester of an aliphatic monohydric alcohol and a polycarboxylic acid anhydride, (ii) acrylic acid and (iii) a polyepoxide in a ratio of between about 0.3 and about 0.9 chemical equivalents of the half ester per chemical equivalent of the polyepoxide and between about 0.7 and about 0.1 chemical equivalents of the acrylic acid per chemical equivalent of the polyepoxide wherein said polyepoxide is a glycidyl ether of 2,2-bis (4-hydroxyphenyl)propane.

2. A composition according to claim 1 wherein the composition comprises (i) said half ester of an aliphatic monohydric alcohol and a polycarboxylic acid anhydride, (ii) said acrylic acid and (iii) said polyepoxide in a ratio of between about 0.3 and about 0.5 chemical equivalents of the half ester per chemical equivalent of the polyepoxide and between about 0.7 and about 0.5 chemical equivalents of the acrylic acid per chemical equivalent of the polyepoxide.

3. A composition according to claim 2 wherein said half ester of an aliphatic monohydric alcohol and a polycarboxylic acid anhydride is the methyl half ester of maleic anhydride.

* * * * *